Feb. 24, 1959

J. LIPINSKI ET AL 2,875,434

REFLECTED WAVE DETECTION SYSTEM

Filed June 9, 1955

INVENTORS
Jedrzej Lipinski &
Theodore C. Cheston.
BY
ATTORNEY

Fig. 3A.
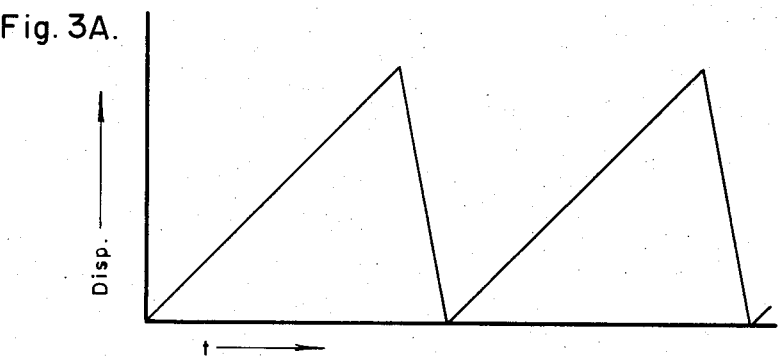
Fig. 3B.
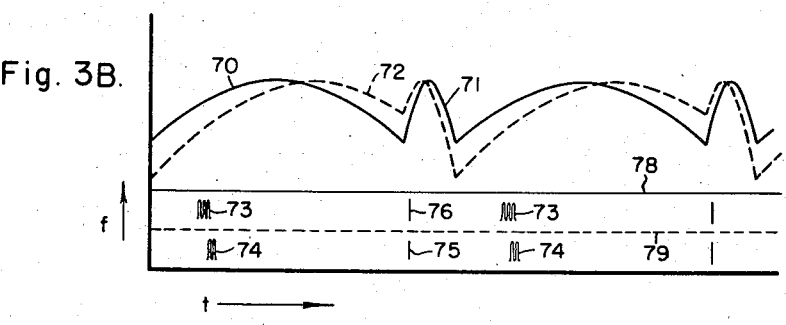
Fig. 3C.
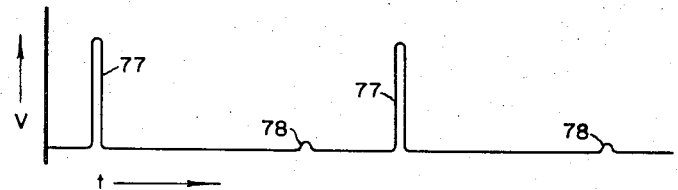
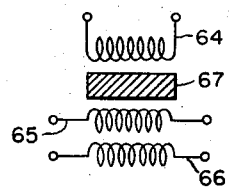
Fig. 4B.

United States Patent Office 2,875,434
Patented Feb. 24, 1959

2,875,434

REFLECTED WAVE DETECTION SYSTEM

Jedrzej Lipinski, Alberton, Ontario, and Theodore C. Cheston, Ottawa, Ontario, Canada, assignors to Canadian Westinghouse Company, Limited, Hamilton, Ontario, Canada Application June 9, 1955, Serial No. 514,182

Claims priority, application Canada June 26, 1954

9 Claims. (Cl. 343—14)

This invention relates to devices for detecting moving objects from a moving location, in particular to a method and a system of detecting from a moving aircraft other moving targets.

In the past, radar systems for operation from aircraft had difficulty in detecting targets which were in the range of the ground returns. Due to the reflecting nature of the surface of the earth, returns were received from the earth over a range from the nearest direct line to the earth and the longest range of the aircraft radar system. These returns would, to a large extent, obscure returns from the desired targets. One of the prime differences between the target and the ground is the different relative velocity of the target relative to the aircraft, and the ground relative to the aircraft. In ground operated radar systems, there has been methods of differentiating between stationary targets and moving targets, but these primarily depended upon the constantly recurring stationary echo from stationary targets. Such systems, obviously, would not be applicable in the present case, since both the target and the ground have velocities relative to the aircraft.

It is, therefore, an object of this invention to provide a radar system which will discriminate between objects having various relative velocities.

It is a further object of this invention to provide a light and compact radar system capable of operation from a moving aircraft and further, capable of discriminating between ground returns and returns from moving targets.

It is a further object of this invention to provide a radar system which will, besides discriminating between objects having different relative velocities, also provide information not only as to the azimuthal relation of the target, but also the elevational relation of the target to the aircraft.

Briefly, these objects are attained by making use of the well known "doppler" effect whereby radiant energy radiated from a source and impinging upon a moving target, being reflected thereby and returned to the source, has a frequency on reception which is dependent not only on the radiated frequency but also upon the relative velocity of the source and the target.

In the system according to our invention, we radiate, by means of a directional radiator, a frequency modulated ultra-high frequency wave. Simultaneously at the radiating source there is also a receiving device which receives waves reflected from the surrounding objects. The received waves will comprise signals similar to the transmitted signal with their frequency modulation phase shifted an amount proportional to the range of the object and with their carrier frequency shifted an amount proportional to the relative velocity of the source and the object. By selecting from this received signal only those signals having frequencies which indicate a relative velocity other than the relative velocity of the radiator to the ground, we are able to select reflections which indicate the presence of moving targets. As the radiating system is directional, we are able, by noting the relative position of the rotating radiator, at the time of reception of the signal, to determine the angular relationship of the radiator and the target. Further, by noting the phase relation of the radiated signal and the received signal modulation frequencies, we may determine the range of the target, and finally, by measuring the "doppler" frequency shift of the carrier of the received signal, as compared to the transmitted signal, we can determine the relative velocity of the target to the source. To provide elevational information, the scanning is performed not only in a horizontal direction but also at selected times in a vertical direction. A clearer understanding of our invention may be had from a consideration of the following description of one specific example, together with the drawings in which:

Figs. 3A to 3C are various graphs useful in explaining a special mode of operation of our system.

Figs. 4A and 4B are illustrations of a suitable filter for use as filter designated 13 in Fig. 1

Figure 1:
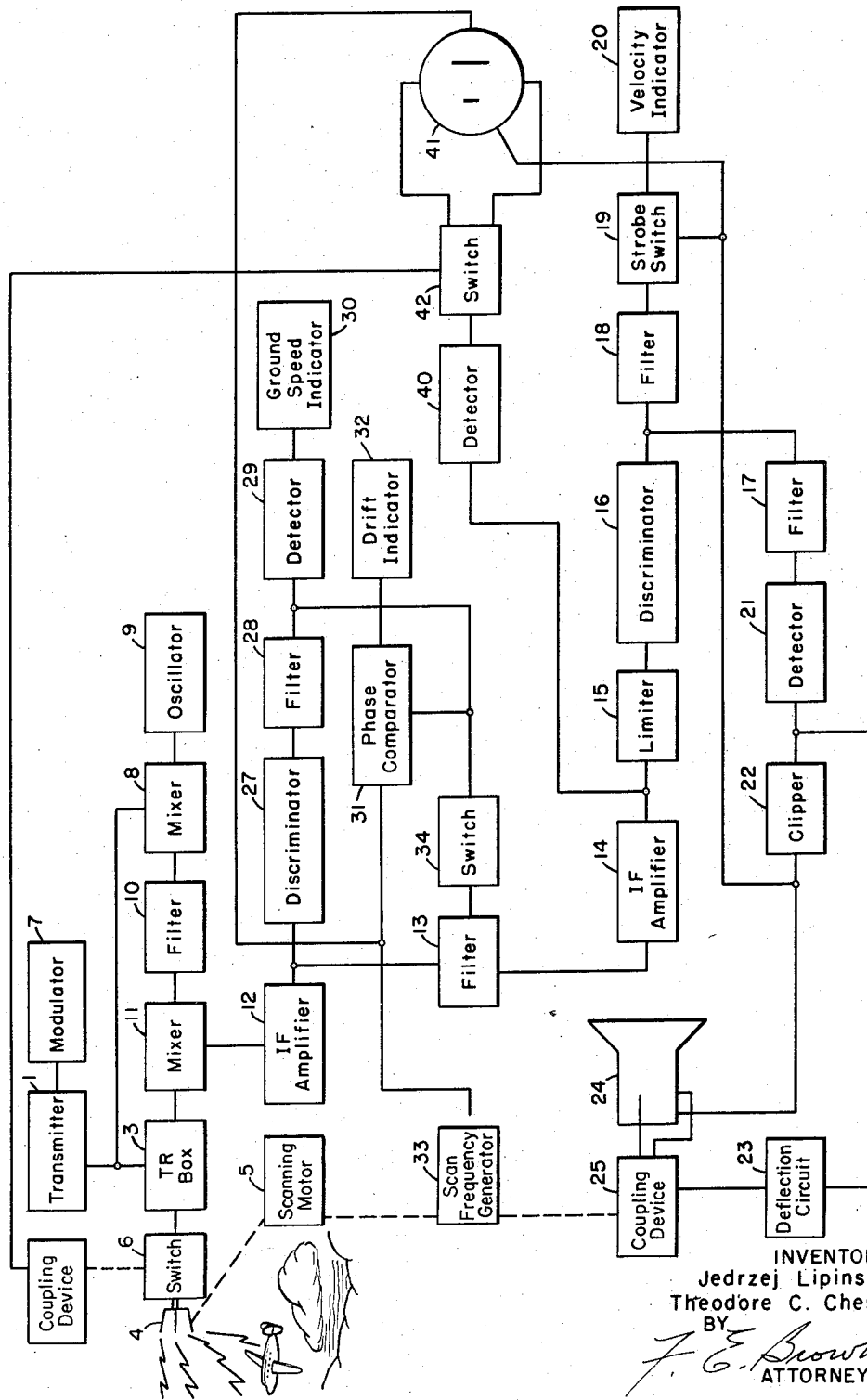
Fig. 1 is a block diagram of a system, according to our invention.

Considering first to Fig. 1, there is shown a transmitter 1, the source of energy for the transmitter being preferably an ultra high frequency magnetron device, and a receiver with a mixer input stage 11; a transmit-receiving device shown at 3 which permits the operation of both the transmitter and the receiver on a single antenna, without mutual interference, and the antenna 4 which comprises an upper and a lower section and is mounted for horizontal rotation by the scanning motor 5; switch 6 is provided for switching from the upper to the lower portion of the antenna and vice versa, and may be left in one position or may be driven by a switching motor as required.

Transmitter 1 is sinusoidally frequency modulated by modulator 7 at a relatively low frequency, preferably in the neighborhood of 240 cycles per second and having a maximum range of frequency deviation of plus and minus 5.3 kilocycles per second. This modulation may be attained by varying the plate voltage of the magnetron over a suitably restricted range. Included in the receiver are means for selecting the frequencies indicating velocities other than the ground velocity, and further means for selecting from the received signal those frequencies indicative both of velocity and of range. Further means are included in the receiver for displaying the resultant of these selected signals in a convenient form.

Normal operation

The frequency modulated energy from the transmitter 1 is passed through the transmit-receive device 3 and through switch 6 to the lower section of the antenna. The field pattern of this antenna is such that the radiation is confined largely to an angle in the neighborhood of 3° in the azimuth direction, and about 10° in the elevational direction with the center line of the radiation pattern being at an acute angle to the plane of flight of the aircraft and generally sweeping out a sector directed toward the ground. The antenna assembly is rotated at a rate of approximately one scan per second, and the energy radiated will strike various objects within the field of scan, including the ground and any moving target within the field of scan. The reflection or re-radiation from objects within the field of scan is picked up by the antenna and fed through switch 6 and transmit-receive device 3 to mixer 11 of the receiver. A portion of the output of the transmitter is fed to a second mixer 8 which is also supplied with a constant frequency oscillation from oscillator 9. These two frequencies when mixed in the mixer produce a plurality of frequencies, one of which is selected by filter 10, and consists of a frequency modulation wave with the same frequency deviation as the transmitter, but having a center frequency determined by the oscillator 9. When this is mixed in the mixer 11, with the incoming frequency, a satisfactory intermediate frequency is produced which is then amplified by intermediate frequency amplifier 12. The difference in phase of the frequency modulation of the received wave and the local wave mixed in the mixer will result in a frequency modulation of the I. F. signal proportional to the phase difference. At any instant the signal in the I. F. amplifier will consist of a frequency modulated wave, modulated at the original modulation frequency whose deviation indicates the range of the target, and having a mean frequency which indicates the velocity of the target.

Considering first the path of this signal through filter 13 which comprises a series of band rejection filters of narrow band pass, which are switched sequentially into the circuit by a switch 34. The operation of this filter will be described at a later point in detail, but it may suffice to say that this filter eliminates from the signal all ground returns or returns from objects which have the same relative velocity with regard to the aircraft as the ground. The output from filter 13 is supplied to a further I. F. amplifier 14 and to a limiter 15 and a discriminator 16. The output from discriminator 16 is fed to two filters. Considering first filter 17 which is a narrow pass filter which accepts only frequencies within the band of the original modulating frequency, the signal which passes through this filter proceeds to a peak detector 21 and a clipper circuit 22. The output of the clipper circuit is applied to the grid of display device 24 which is a cathode ray tube. The circuits and supply voltages of display device 24 are so arranged that the beam does not cause any illumination of the screen in the absence of a bright-up signal from the clipper 22. The signal from detector 21 is also supplied to a deflection circuit 23 which produces an instantaneous deflection voltage proportional to the amplitude of the signal from detector 21. This deflection voltage is applied to a coupling device 25 which is mechanically driven by the scanning motor 5. The output from coupling device 25 is applied to the deflection circuit of the cathode ray tube 24 causing the beam to be deflected an amount proportional to the signal produced by detector 21 and in a direction related to the instantaneous direction of the antenna.

The signal from discriminator 16 is also applied to filter 18 which is a narrow band reject filter which rejects the modulation frequency. The signals which pass through the filter 18 are applied to a time controlled or "strobe" switch 19 which selects the particular signal which is being considered and applies it to a velocity device 20 which is a peak detector and integrating circuit for measuring the peak value of the signals which pass through filter 18. Essentially, 20 is a voltage sensitive device which may be calibrated directly in relative velocity.

Returning once more to the signal from the I. F. amplifier 12, it will be seen that it is also applied to discriminator 27. The output of discriminator 27 is applied to filter 28 which is a low pass filter accepting only frequencies in the neighborhood of the scanning frequency, preferably below 10 cycles per second. The output of this filter is supplied to peak detector 29 which supplies the ground speed indicator 30 which is essentially a voltage sensitive device which may be calibrated directly in miles per hour indicating the relative speed of the ground.

The output from filter 28 is also applied to a phase comparator 31 which compares the output of filter 28 with the output from generator 33 which is mechanically coupled to scanning motor 5. The result of this comparison is applied to indicator 32 which is calibrated in degrees and indicates the phase relation of the signals applied to 31. Indicator 32 also indicates the angle of drift of an aircraft on which the radar set is mounted in a manner hereinafter described.

A clearer understanding of the operation of this circuit may be had by consideration of the graphs of Figs. 2A to H inclusive.

Figure 2A:
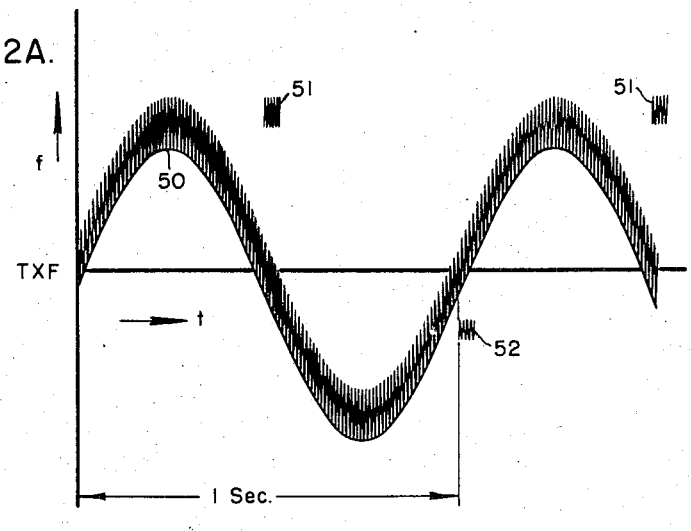
Figs. 2A to 2H are various graphs indicating the form of response at various points in the system.
Figure 2B:
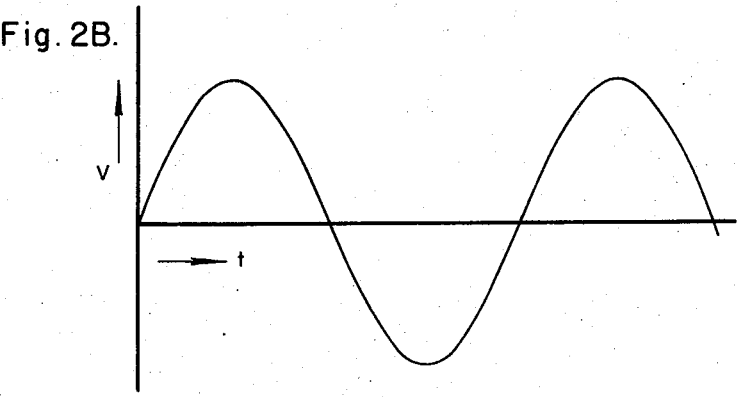

Fig. 2A illustrates graphically the signal present in the I. F. amplifier which is similar to the received signal except that the phase relation of the modulating frequency has been converted to a frequency deviation. It is drawn on an axis of frequency versus time.

Curve 50 represents the signals received from the ground. It will be noted that the signal received from the ground varies first, from the transmitter frequency which is the base line and marked TXF to a maximum frequency and back to the transmitter frequency. This cycle is repeated sinusoidally as the antenna swings around in its horizontal direction. When the antenna points at right angles to the direction of flight of the aircraft, the received frequency from the ground will be equal to the transmitted frequency. When the antenna points due ahead of the direction of flight of the aircraft, the frequency due to the ground returns will be the transmitted frequency plus a frequency due to the "doppler" effect, i. e. the peak amplitude of the primary sine wave of curve 50 will indicate the relative ground velocity. Superimposed upon the primary sine wave is a secondary sine wave due to the modulation of the transmitter and the range of the ground return. The amplitude of this secondary sine wave is shown constant as it would be only under ideal conditions where the ground beneath the aircraft was absolutely flat. In actual operation the secondary sine wave would have a random amplitude, never in excess of the maximum range, but frequently less due to the varying contours of the ground. The ground wave then consists of a band of frequencies dependent upon the frequency deviation of the transmitter and varying from a positive value to a negative value dependent on the ground velocity of the aircraft in a sinusoidal manner. Also present in the received wave and in the I. F. signal will be signals due to moving targets such as signals 51 and 52. The time position of these signals will, of course, depend upon the relation of the target to the aircraft. The mean frequencies of these signals, signal 51 for example, will be dependent upon the relative velocity of the target and the aircraft. Also present in the signal 51 is a sinusoidal modulation due to the transmitter modulation. The amplitude of this sinusoid will be dependent upon the range of the target from the aircraft. It will be noted that signal 51 recurs since there is illustrated more than one complete scan of the antenna.

It will be interesting to note at this point what information we can derive from a visual inspection of this graph. Considering signal 51, by its location relative to the primary sine wave of the ground return, we can determine that the target is approximately at right angles to the aircraft, since it appears at a crossover point of the primary sine wave and the transmitter frequency. Second, due to its position on the graph in a vertical direction, we can determine that the relative velocity of the target to the aircraft is slightly greater than the ground velocity of the aircraft. Comparing the relative amplitudes of the sine waves, in signals 51 and 52, we can see that the range of the target producing signal 51 is slightly greater than the range of the target producing signal 52. We may also deduce that the target producing signal 52 is relatively at 90° to the direction of flight of the aircraft but on the opposite side of the aircraft as compared to the target producing signal 51. It may also be seen that the relative velocity of the target producing signal 52 is much less than the relative velocity of the target producing signal 51.

In 2B is shown the signal output from filter 28 which consists only of the primary sine wave of the ground return. From this graph it will be clear that if by means of detector 29 we measure the peak amplitude of sine wave in Fig. 2B, we will have an indication of the relative ground velocity of the aircraft. A further piece of information may be obtained from Fig. 2B. If we compare the sine wave in Fig. 2B with the rotational position of the antenna, it will be noted that the maximum of this sine wave occurs when the antenna is pointing in the direction of motion of the aircraft, and its cross-over point occurs when the antenna is pointing at right angles to the direction of motion of the aircraft. If, therefore, the maximum of this sine wave does not occur when the antenna is pointing along the main axis of the aircraft, it will be clear that the aircraft is drifting. That is to say, whenever the maximum of the sine wave occurs when the antenna is pointing at an angle to the longitudinal axis of the aircraft, then the maximum speed of the aircraft relative to the ground is along that angle, and consequently the aircraft is drifting from its course. A direct measurement of the angle of drift of the aircraft may be obtained by comparing the phase relationship of this sine wave with the rotational position of the antenna. This phase relationship is conveniently indicated on indicator 32.

Figure 2C:
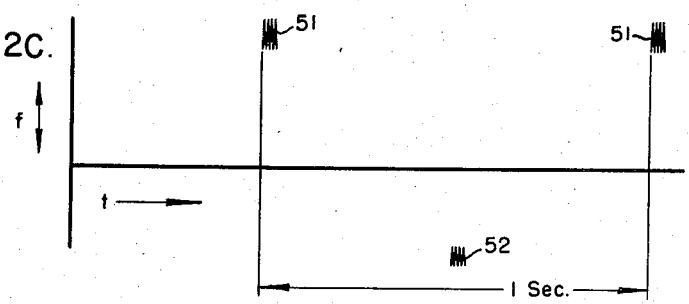

Fig. 2C illustrates the output of filter 13, the input being as shown in Fig. 2A. This graph is also drawn on a frequency versus time basis. It will be noted that signals 51 and 52 are still present in their original form, but the ground wave has been eliminated.

Figure 2D:
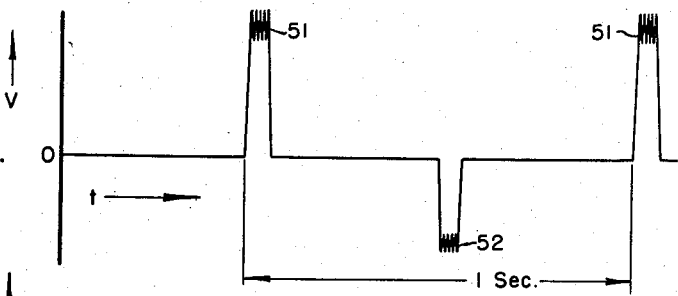

Fig. 2D represents the output from discriminator 16 and it will be noted that the frequency variations have been converted to voltage variations and this graph is drawn on a basis of voltage versus time.

Figure 2E:
Figure 2F:
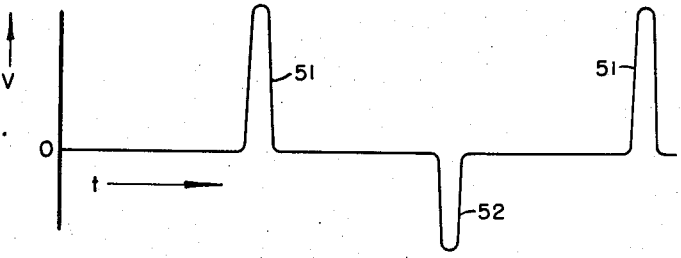

Fig. 2F represents the output of filter 18, whose input has been shown at 2D. It will be noted that the sinusoidal ariation at the top of the pulse has been eliminated and the pulse is now a simple pulse having a mean amplitude equal to the mean amplitude of 51 in Fig. 2D.

Figure 2G:
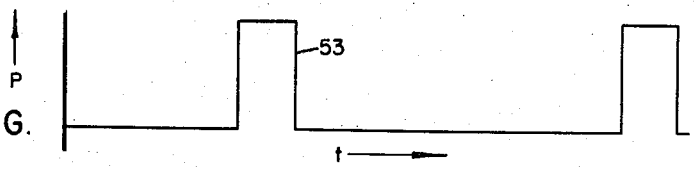

Fig. 2G is a graphical representation of the operation of "strobe" switch 19 which shows a gating pulse 53 on a graph whose base line is time and whose vertical measurement indicates the conductivity of the switch. It is assumed that we are only interested in the signal 51 and, therefore, the switch is conductive only during the period in which signal 51 is present.

Figure 2H:
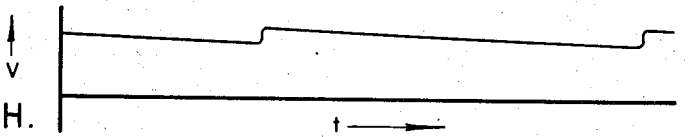

Fig. 2H shows the output of the peak detector in velocity indicator 20 which measures the peak value of pulse 51 and applies it to the velocity indicator.

Fig. 2E represents the output of detector 21. It will be noted that since filter 17 accepts only frequencies within the modulation frequency band, that the output of this detector due to signals 51 and 52 is represented by a small pulse whose amplitude is proportional to the amplitude of the sinusoidal deviation of signal 51 or 52.

Figure 4A:
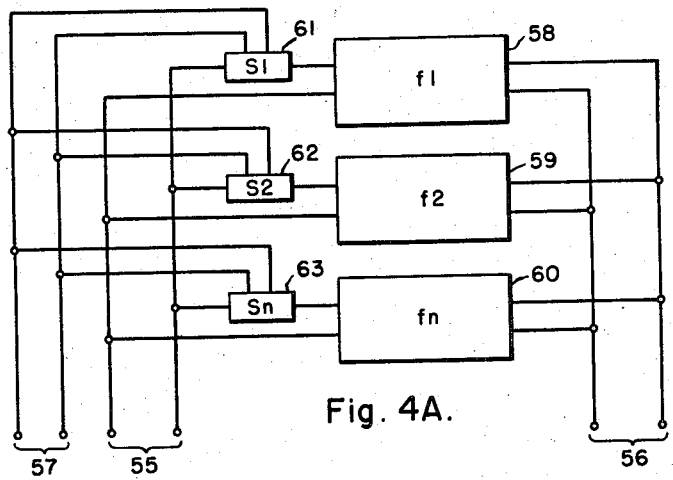
Figure 4C:
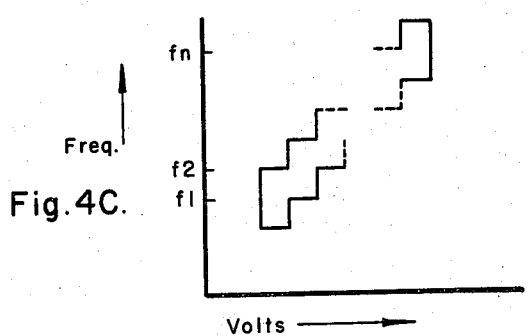
Fig. 4C is a graphical representation of the characteristics of the filter shown in Fig. 4A.

The details of filter 13 and switch 34 are shown in Fig. 4A while Fig. 4B illustrates the construction of a portion of the filter and Fig. 4C is a graphical representation of the characteristics of the filter in frequency rejection versus control voltage. Terminals 55 in Fig. 4A are the input terminals of filter 13 while terminals 56 are the output terminals. Arranged in parallel between these terminals are a series of filter elements designated 58, 59 and 60. Only three are shown but it should be understood that element 58 rejects frequencies centered about frequency $f_1$ while element 59 rejects frequencies centered about frequency $f_2$. Many other intermediate elements will be included ending with element 60 which reject frequencies centered about frequency $f_n$ and a further filter which passes frequencies above those representative of maximum ground speed. The value of $f_n$ will depend upon the maximum velocity of the aircraft. In series with each element is a switching device, these devices being designated 61, 62 and 63. These switches are normally closed but may be opened in response to a specific range of control voltage, the control voltage being applied to terminals 57.

In Fig. 4B is shown a suitable form of switch which may be used for switches 61, 62, etc. The switch comprises three windings 64, 65 and 66 on a common ferrite core 67.

In operation, a polarizing current is applied to coil 64 to determine the condition of operation of the switch, a switching wave form is applied to coil 65 from terminals 57 and the input and output terminals of the switch are the terminals of coil 66. Due to the magnetic characteristic of the core the impedance of coil 66 becomes very great when the net ampere turns of coils 64 and 65 approach zero. This is equivalent to the open circuit condition of the switch. When the net ampere turns are not near zero, however, there is an abrupt decrease in the impedance of coil 66 which is equivalent to the closed circuit condition of the switch. In operation, a suitable switching wave form, in the particular example described a sine wave of amplitude determined by the wave form of Fig. 2 and in phase with this wave, is applied to terminals 57. A bias voltage is applied to each switch coil such that each switch operates at a different voltage. The result of this bias may best be appreciated from Fig. 4C which is a graphical representation of the filter characteristic on a voltage versus frequency basis where the voltage is the control voltage applied to terminals 57 and the frequency is the frequency rejected by the filter of Fig. 4.

It will be seen that as the control voltage is varied various filter elements are removed from the filter causing the filter to reject various bands of frequencies from $f_1$ to $f_n$. This illustration is of course idealized since the acceptance band of a filter is not usually characterized by an abrupt change from rejection to acceptance, however, a sufficiently close approximation can be obtained by the use of electromechanical filters for elements 58, 59, etc.

The filtering circuit as described has the advantage that a wave derived from the ground return may be used to control the filter to thus ensure that the ground return signals are essentially eliminated from the signals fed to limiter 15. This function is achieved by feeding the output of filter 28 to switch 34 which represents the switches $S_1$, $S_2$, $S_n$, etc., as shown in Fig. 4A. As the output of filter 28 varies (Fig. 2B), the various switches are closed sequentially so that the rejection band of filter 13 coincides at any instant with the frequency bandwidth of the ground return signals illustrated by curve 50 in Fig. 2A. Since the frequency deviation of the ground return signal is proportional to aircraft velocity and since the phase of the ground wave signal is dependent upon the degree of drift of the aircraft, it will be seen that this method of operation is of importance in rejecting ground return signals. This becomes even more important when the ground return wave as shown in Fig. 2 is not sinusoidal as will be the case when the antenna scan is not a complete revolution.

The "strobe" switch 19 referred to previously is a device commonly used in radar circuits. However, for a clearer understanding of the operation of this device, it may be stated that the switch operates as a time controlled gating circuit which permits signals to pass only during a predetermined time interval. This time interval is controllable by the operator and its specific occurrence is indicated on the indicator device generally by a brightening of a portion of the trace. A satisfactory circuit for this "strobe" switch might comprise a saw-tooth wave generator whose recurrence frequency is the same as the scanning frequency of the antenna. This saw-tooth wave may be applied to some form of voltage sensitive pulse generator which may be biased to produce a voltage output pulse at some predetermined point on the saw-tooth wave. By varying the bias of the pulse generator, the point of occurrence of the output pulse may be controlled so the pulse occurs anywhere along the saw-tooth wave. If the bias adjustment of the pulse generator is under the manual control of the operator, then the operator may control the time of occurrence of the pulse. This pulse may then be utilized to control a switch tube through which the signals from filter 18 are passed to the velocity sensitive device 20. A portion of this pulse may also be used to brighten up the trace of display device 24.

When it is desired to examine the velocity of some particular target as indicated by a brightening up on the display device 24, the "strobe" switch is adjusted until the strobing gate occurs in the same time interval as the signal from the target in which we are interested. As previously referred to, this "strobe" pulse may be applied to the display device and when the strobe pulse and the target appear on the same portion of the display device face, then they occur at the same time and the target under examination will be the only target which is selected. It will be seen that there is some possibility of ambiguity in the event that two targets occur at almost identical bearings when it may be possible that both signals may be passed through the time gate. This effect may be minimized by making the gate as narrow as is practical having in mind the necessity of its manual adjustment by an operator.

Coupling device 25 may be a device sometimes known as a "magslip." This device comprises a pair of windings at right angles to each other in the frame of a rotary electric device similar in construction to a small motor. If these two windings be considered as field windings, then we may consider the third winding which is mounted on a rotor for rotation within the field of the first two windings as an armature winding. The output from deflection circuit 23 is applied to the armature winding and the output from the two field windings is applied to the two pairs of deflection electrodes of the cathode ray display device 24, one end of each winding being connected to one of the horizontal and vertical deflection electrodes respectively, and the other end of each winding being connected to the other of the said deflection electrodes. If the windings are properly proportioned and arranged, it will be found that a deflection voltage applied to the armature will cause a deflection of the cathode ray tube beam. The amplitude of the deflection will be independent of the position of the armature but the direction of the deflection will be directly related to the direction of the armature relative to the two field coils. As the armature is rotated the deflection of the cathode ray beam will be rotated in synchronism. By driving the armature from the scanning motor, we create a display wherein the direction of the cathode ray beam sweep corresponds to the direction of the antenna and the radial distance of the brightened sweep corresponds to the range of the target. From the equipment already described, the operator may ascertain the direction of a target, the range of a target, the velocity of the target and also the ground velocity of his own aircraft. He may also determine the drift of his own aircraft. The direction referred to above, of course, is the angular direction of the target relative to the aircraft in an approximately horizontal plane. Having determined the foregoing, it is necessary, in order to find the target, to have some indication of its elevational angular direction. To this end, the system may be operated in a further manner for short range operation.

Short range operation

For short range operation, to determine specific information about a particular target, the aircraft is aimed toward the target. The scanning device then scans a limited forward sector, for example, in the neighborhood of 45°. With the antenna operating in this manner, the "doppler" frequency due to the ground returns will always be large, whereas the "doppler" frequency due to the moving targets which are being pursued will be relatively small, since the relative velocity of the target and the pursuing aircraft is small while the relative velocity of the ground and pursuing aircraft is large. It is, therefore, possible to use a narrow band I. F. amplifier which would then pass only the frequencies due to reflections from the target, but it will be found more convenient to limit the band width by manual control of filter 13. The range information may be determined in the same manner as before since it will give rise to a frequency modulation of the I. F. frequency whose amplitude is proportional to the range of the target. This will be converted in discriminator 16 to a sinusoidal voltage whose amplitude is proportional to range. By switching from the upper to the lower antenna by means of switch 6, two distinct radiation patterns can be obtained. This is standard procedure for obtaining elevational information. The response of the target, i. e. the amplitude of the signal received at the antenna from one specific target from each of the two antennas, indicates its relative position with respect to the antennas in a vertical angular direction. The relationship of the ratio of the signals from each antenna to the particular elevational angle is of a rather complex nature, depending on the characteristics of the antenna. Since the operation at short range depends upon the amplitude of the signal returned, it is necessary to put in a further detection circuit. The input for this detector is derived from the output of I. F. amplifier 14, and the output from detector 40, which is a linear amplitude detector, is applied to the deflection electrodes of display device 41 through switch 42, switch 42 being driven in synchronism with switch 6, by means of electromechanical coupling device 26. The amplitudes of the pulses above and below the center line of display device 41 will indicate the relative position of the target. When the amplitude of the signal is equal both above and below the line, the target is in the same horizontal plane as the aircraft. The amplitude of the pulses occurring on the screen of display device 41 will be dependent upon the output of detector 21, while their ratio is dependent upon the position of the target. It may be so arranged that for a standard target the face of display device 41 may be calibrated to indicate approximately the range of the target. So that it may be possible to differentiate between targets on display device 41, the beam of this cathode ray device is scanned horizontally in synchronism with the scanner motor 5. This scanner motor is now causing the antenna to oscillate back and forth over a forward angle of approximately 45° and the beam of the display device 41 is similarly deflected. It will be necessary that the switching speed of switch 6 is sufficient to cause a complete elevational sweep for every discernible angular position. With inputs to the display device 41 as indicated, the horizontal position of the indication will indicate the azimuth bearing of the target. The amplitude of the pulse above and below the center line of the display device 41 will indicate the elevational position of the target. The amplitude of the sum of both the upper and lower pulse will indicate the range of the target. It will then be seen that by flying the aircraft in such a manner that the display is centered in the center of display device 41 and equally displaced about its center line that the aircraft will be flying directly towards its target, and when the target is within a certain range the amplitude of the whole signal will have a predetermined value.

While operating in this short range method, it may occur that more than one target appears on the same bearing. Discrimination may be possible between the targets due to their difference in velocity. To this end, filter 13 is manually adjustable so that frequencies indicating only one velocity are passed. By adjusting the filter until only the desired target is indicated on display device 41, the velocity of the desired target will be indicated by the setting of filter 13 and the interfering effect of other targets will be eliminated.

Figs. 3A to 3C will be useful in understanding the system as operated in a forward direction only. The wave form of Fig. 3A is a time displacement graph for the scanning device. It is scanned slowly over an angle of 45° and then rapidly returned to its initial position. The scanning may take place once per second as before but is restricted to a forward direction. As a result the I. F. signal is as shown in 3B except that while the ground return comprises a band of signals as shown in 2A, no attempt has been made to so illustrate it, but rather for the sake of clarity merely the basic ground return wave form is shown. This graph is drawn on a frequency versus time basis. The curvature of line 70 corresponds to the top portion of a sine wave. Signals 73 and 74 represent targets similar to those shown in Fig. 2A. It will be seen that the whole ground wave can be eliminated from the signal by restricting the I. F. band width leaving only signals 73, 74, 75 and 76 which represent targets. These signals then yield velocity and range information as illustrated in Figs. 2C to H. The signals are also supplied to detector 40 yielding an output as shown at Fig. 3C which is a graph of voltage versus time. This signal may then be applied to display device 41. It will be seen that targets indicated by signals 73 and 74 are on the same bearing and this will give rise to confusion on display device 41. To eliminate this confusion, filter 13 may be manually adjusted as previously indicated so that it accepts only the frequencies representing the desired signal. For example, it may not accept any frequencies lower than line 79 and in this case only signal 73 will be received by the detector 40 and displayed on the display device 41. Simultaneously range and velocity information will be restricted to signals falling within the accepted band, i. e. signals from targets having approximately the same relative velocity.

Also illustrated in Fig. 3B is the effect of drift on the ground return wave. This is shown in the dotted curve 72. The peaks of the curve on the scan and return sweep are displaced and the frequency band of the ground return wave is slightly extended. It will be seen, however, that if filter 13 never permits frequencies greater than that indicated at 78 to be passed then the ground wave will invariably be eliminated. Signals 75 and 76 are the result of targets 73 and 74 being scanned by the return sweep and should be disregarded. They could be eliminated from the display by blanking display device 41 during the return sweep.

Figure 5:
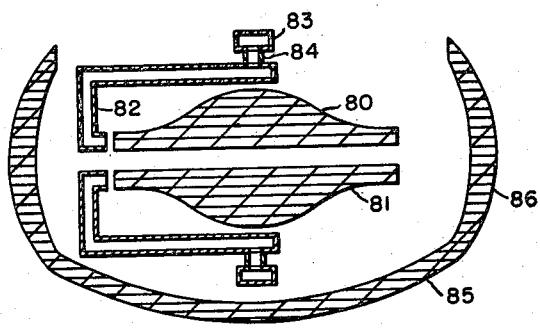
Fig. 5 is an illustration of an antenna which is particularly suitable to our system.

Fig. 5 shows one particular type of antenna suited to this system when operating with a 360° scan. The antenna comprises a pair of dielectric lenses 80 and 81 and two rotating wave guides 82. The energy from wave guide 83 energizing from the end of the wave guides 82 is focused into a narrow sector by the dielectric lens and rotates as the guides 82 rotate on their couplings 84. Surrounding the antenna is a protecting dielectric dome 85. The vertical walls of the dome are so shaped as to produce a cylindrical lens 86 and reduce the vertical angle of radition of the antenna. The purpose of the two antennas is of course as previously explained to permit vertical lobing to obtain elevational information. The antenna as shown will produce a shadow to the rear where the wave guide 83 passes around the lenses 10 and 81 to feed the lower radiator. This will not normally be objectionable if the shadow is arranged to occur to the rear of the aircraft since the aircraft should normally proceed on a deviating course to obviate the possibility of a target proceeding on a parallel course at the same velocity being undetected. It would be possible, however, to arrange the feed to the lower radiator so that it did not interfere and produce a shadow by many other arrangements, such as for instance, a coaxial pair of wave guides, one feeding the lower antenna, or a common rotating feed.

Calibration

An examination of the above system will indicate that this system is not self-calibrating. For example, the deflection of the indicating device 24 must be made proportional to the output of the peak detector in terms of range, while the indication of the velocity indicating meter 20 must be made proportional to the output of "strobe" switch 19. These calibrations will be most conveniently carried out by producing an artificial target. A suitable target may be produced by mounting on the ends of an arm two reflecting devices made of metal-backed plastic rods having a specific shape relative to the wave length of the transmitted energy. By setting these reflecting devices a specified distance from the transmitting antenna the range circuit may be calibrated. By rotating the arm rapidly about its center so as to cause the reflecting devices to describe a circular path, the reflectors will have a velocity relative to the system and the velocity circuit may be calibrated.

In our discussion of the "doppler" frequency of ground returns, we indicated that returns from the groud when the antenna is pointed at right angles to the direction of flight of the aircraft would have a "doppler" frequency of zero. This is, of course, the main frequency of the ground return at this point since the antenna has a finite beam width. When diving or banking, the vertical beam width becomes effective as well as the horizontal beam width, and the ground returns may cover a greater band of frequencies than normal. However, under the most severe conditions, i. e. with the aircraft banking vertically, and using the vertical beam width to determine the frequency spread of the ground returns, it will be found that under normal filter design of filter 13, there will be very little of the ground returns passed by the filter.

It will be understood that numerous variations could be made in this system according to our invention without departing from its main concept; particular methods of producing the displays are not considered of importance, since the information obtained may be displayed in many ways. The information available is most readily recognized from Figs. 2A to 2H, and any method of deriving from the signal as indicated in Fig. 2A, the information which is available as indicated by the following figures would be satisfactory. It was felt, however, that cathode ray tubes were the most satisfactory display devices due to their extreme flexibility. It may also be pointed out in connection with filter 13 that the specific filter described is not necessary to the system. It is merely necessary that the function accomplished by the filter should be available to the system, and it was felt that an electromechanical filter of the type described would be the most compact and practical.

It should also be noted that while a variable frequency filter has been shown, this is only one method of producing the desired result, that is elimination of signals from objects having a specific velocity relative to the radiator. Another possible solution, for example, would utilize a fixed frequency filter and a local oscillator frequency modulated in accordance with the antenna scan and ground velocity, thus converting the ground return in the I. F. signal to a constant frequency which could then be eliminated by the filter.

We claim as our invention:

1. A reflected wave detection system comprising a transmitter for generating frequency modulated high frequency energy, a directive radiator for radiating said energy, a receiver for receiving such of said radiated energy as is reflected from surrounding objects, a mixer in said receiver to mix said reflected energy with a signal derived from said transmitted energy, a detector to derive from said resultant mixed signal signals having a frequency modulation dependent upon the distance from the radiator to the reflecting objects giving rise to the reflections and a mean frequency dependent on the velocity of the reflecting objects relative to the radiator, a variable band rejection filter connected to said mixer and operable in response to the output of said detector for rejecting signals having certain mean frequencies and display means to display the remaining signals in accordance with their frequency modulation and mean frequency.

2. In a reflected wave system for detecting objects, means to transmit frequency modulated waves to impinge on the said objects, means to receive waves reflected from the said objects, means to mix the received waves and a locally produced wave frequency modulated in accordance with the transmitted waves so as to produce a beat frequency signal whose mean frequency is dependent upon the velocity of the reflecting object and whose modulation deviation is dependent upon the distance from the transmitter to the reflecting object, a discriminator connected to said mixing means for producing a voltage which varies as a function of the frequency of said beat frequency signal, variable band rejection filter means operable in response to the output of said discriminator to eliminate from the beat frequencies signals having a mean frequency indicative of certain specific velocities, and means to utilize the remaining beat frequencies to indicate the range and velocity of the reflecting objects.

3. A reflected wave detection system comprising a transmitter for generating frequency modulated energy, a directive antena for radiating said energy, means for causing said antenna to scan at a predetermined scanning frequency, means for receiving such of said transmitted energy as is reflected from surrounding objects, a pair of signal channels into which said received signals are fed, one of said channels including a frequency discriminator and a filter coupled to the output of said discriminator, said filter being tuned to said scanning frequency, variable band rejection filter means including in said other channel, and means responsive to the output of said first-mentioned filter for varying the rejection band of said variable filter means.

4. A reflected wave detection system comprising a transmiter for generating frequency modulated high frequency energy, a directive antenna for radiating said energy, means for causing said antenna to scan at a predetermined scanning frequency, means for receiving such of said transmitted energy as is reflected from surrounding objects, a frequency discriminator coupled to the output of said receiving means, a filter coupled to the output of said discriminator, said filter being tuned to said scanning frequency, a plurality of band rejection filters each of which is adapted to be connected to the output of said receiving means, and switch means responsive to the output of said first-mentioned filter for connecting said band rejection filters to the output of said receiving means in succession.

5. The combination claimed in claim 4, wherein the switch means comprises a plurality of switches of the ferrite core type, each of said switches serving to connect said receiving means to an associated one of said filters.

6. A reflected wave detection system comprising a transmitter for generating frequency modulated high frequency energy, a scanning antenna for radiating said energy, means for receiving such of said transmitted energy as is reflected from surrounding objects, variable band rejection filter means coupled to the output of said receiving means, means for deriving a voltage which varies as a function of the scanning angle of said antenna, and switch means operable in response to said voltage for changing the rejection band of said variable filter means.

7. In a moving aircraft, a reflected wave detection system mounted on said aircraft and comprising a transmitter for generating frequency modulated high frequency energy, an antenna for radiating said energy, means for receiving such of said transmitted energy as is reflected from surrounding objects, variable band rejection filter means coupled to the output of said receiving means, means for deriving a voltage which varies as a function of the velocity of the ground below said aircraft relative to said aircraft and which also varies as a function of the amount of energy radiated from said antenna which strikes the ground and is reflected thereby, and switch means operable in response to said voltage for changing the rejection band of said variable filter means.

8. Apparatus for indicating the drift of an aircraft relative to the ground comprising a transmitter for generating frequency modulated high frequency energy, a directive antenna for radiating said energy, means for causing said antenna to scan at a predetermined scanning frequency, means responsive to said last-mentioned means for generating an alternating-current signal having a frequency corresponding to said scanning frequency, means for receiving such of said transmitted energy as is reflected from surrounding objects, a mixer in said receiver to mix said received energy with a signal derived from the energy generated by said transmitter, a frequency discriminator and a filter coupled to the output of said receiver, said filter being tuned to said scanning frequency, and means for comparing the phase of the output of said filter with the output of said generator to produce a signal which varies as a function of the difference in phase between said signals.

9. Apparatus for indicating the drift of an aircraft relative to the ground comprising a transmitter for generating high frequency radio energy, a directive antenna for radiating said energy, means for causing said antenna to scan at a predetermined scanning frequency, means responsive to said last-mentioned means for generating a signal which varies as a function of said scanning frequency, means for receiving such of said radiated energy as is reflected from surrounding objects, a frequency discriminator and a filter coupled to the output of said receiving means, said filter being tuned to said scanning frequency, and means for comparing the phase of the output of said filter with the output of said generating means.

References Cited in the file of this patent

UNITED STATES PATENTS

| 2,422,135 | Sanders | June 10, 1947 |
| 2,581,847 | Espenschied et al. | Jan. 8, 1952 |
| 2,612,636 | Rust | Sept. 30, 1952 |
| 2,621,243 | Sunstein | Dec. 9, 1952 |
| 2,678,440 | Watt | May 11, 1954 |
| 2,695,995 | Cauchois | Nov. 30, 1954 |

FOREIGN PATENTS

| 592,596 | Great Britain | Sept. 23, 1947 |